United States Patent [19]
Fujiya et al.

[11] Patent Number: 4,503,481
[45] Date of Patent: Mar. 5, 1985

[54] GAS INSULATED SWITCHGEAR EQUIPMENT

[75] Inventors: Sigeru Fujiya; Tohru Tsubaki; Naoki Amano, all of Hitachi; Kyuzi Yaginuma, Katsuta; Hitoshi Kayaba; Yoriyuki Aiko, both of Hitachi; Takeshi Takahashi, Hitachiota, all of Japan

[73] Assignee: Hitachi, Ltd., Tokyo, Japan

[21] Appl. No.: 362,047

[22] Filed: Mar. 26, 1982

[30] Foreign Application Priority Data

May 20, 1981 [JP] Japan .................. 56-75020
Jun. 19, 1981 [JP] Japan .................. 56-94056

[51] Int. Cl.$^3$ ............................. H02B 1/04
[52] U.S. Cl. ................. 361/341; 200/50 AA; 361/333; 361/335
[58] Field of Search ............ 361/332, 333, 335, 341, 361/361, 363; 200/50 AA, 48 R

[56] References Cited
U.S. PATENT DOCUMENTS 3,777,083 12/1973 Olson et al. .............. 200/48 R
4,209,821 6/1980 Kobayashi et al. ......... 361/333
4,237,520 12/1980 Oishi et al. .............. 361/333
4,262,323 4/1981 Yoshiba .................. 361/333

FOREIGN PATENT DOCUMENTS 15225 9/1980 European Pat. Off. ...... 361/333
2708360 8/1978 Fed. Rep. of Germany .... 361/335
48-9320 2/1973 Japan .

Primary Examiner—A. D. Pellinen
Assistant Examiner—Gregory D. Thompson
Attorney, Agent, or Firm—Antonelli, Terry & Wands

[57] ABSTRACT

A gas insulated switchgear equipment in which three circuit breakers are electrically connected in series between two main bus bars. The two main buses are parallelly mounted on a fixing base. The three circuit breakers are arranged on one side of the main buses and aligned in the axial direction of the main buses. Connecting buses for electrically connecting the circuit breakers are provided on one side of the circuit breakers where the main bus bars are also disposed. Thus, the circuit breakers are accessible from the other side thereof for their maintenance and inspection and the equipment mounting area can be minimized because the main buses are disposed in parallel.

16 Claims, 27 Drawing Figures

GAS INSULATED SWITCHGEAR EQUIPMENT

The present invention relates generally to a gas insulated switchgear equipment, and more particularly, to the layout configuration of a gas insulated switchgear equipment in which a plurality of circuit breakers are connected in series through which power is supplied or received.

In a gas insulated switchgear equipment, live conductors are placed in a sealed metallic enclosure in which an insulating medium such as an $SF_6$ gas is filled in order to minimize the insulation distances necessary for insulation between the respective conductors as well as between the conductors and the ground so that the switchgear equipment is reduced in its size. Generally, since an enclosure which contains therein an electrical component such as a circuit breaker is maintained at an earth potential, it can be disposed considerably close to another similar enclosure. Further, the gas insulated switchgear equipment can be remarkably reduced in the mounting area occupied by the equipment, by providing three-dimensional arrangement to the equipment.

The switchgear equipment of this type, however, is restricted in its arrangement by other factors. More specifically, first, the component elements of the equipment must be accessible for their maintenance and inspection and accordingly the switchgear equipment must have an arrangement and space enough to allow easy access to the elements for easy maintenance and inspection. Also, even if the realiability of the respective component elements of the equipment has been improved, circuit breakers used in the equipment to cut off a large current such as a short-circuit current must also be arranged so as to facilitate a periodical inspection as well as a countermove in case of abnormality in the equipment.

A so-called one-and-a-half circuit breaker (CB) system is widely used for the gas insulated switchgear equipment for constituting a substation. In the prior-art gas insulated switchgear equipment of this type, a pair of main bus bars are parallelly disposed in a predeterminedly spaced relation, and three circuit breakers are transversely disposed with respect to the main buses and electrically connected to each other to constitute a desired electric circuit.

A defect in this prior art switchgear equipment is that the main bus bars are located on both sides of each circuit breaker which requires maintenance and inspection thereof as necessary. For this reason, it is necessary for workers to go over the main bus bars in order to maintain or inspect the respective circuit breakers, and a wrecking car and other checking vehicles can not be accessible to the circuit breakers for their maintenance and inspection because of the main buses lying before the car. Accordingly, a large crane vehicle must be disposed at all time at a position near to the main bus bars and not going across the buses, for maintenance and inspection of the circuit breakers and in order to cope with abnormality occurring in the system.

There is also widely employed a so-called ring bus system using gas insulated switchgear equipment for constituting a substation. However, this type of switchgear equipment is also inconvenient in maintenance and inspection of the respective circuit breakers of the equipment because of the peculiar arrangement of this ring bus system.

Accordingly, it is an object of the present invention to provide a gas insulated switchgear equipment which allows easy maintenance and inspection of circuit breakers thereof.

Another object of the present invention is to provide a gas insulated switchgear equipment which requires a reduced mounting area or space.

A further object of the present invention is to provide a gas insulated switchgear equipment which enables to constitute the one-and-a-half CB system or the ring bus system by using a plurality of common units.

According to the present invention, for example, in the case where circuit breakers of a vertical type are used, the one-and-a-half CB system or the ring bus system is made up of substantially U-shaped structure units each comprising the vertical circuit breaker, current transformers at both ends of the circuit breaker, and disconnecting switches electrically connected in series with the circuit breaker at the respective ends thereof. With such an arrangement, since the plural circuit breakers can be alined, the maintenance and inspection of the circuit breakers can be highly facilitated.

The present invention will be apparent from the following detailed description taken in conjunction with the accompanying drawings, in which:

FIGS. 1 and 2 each shows a skeleton diagram of an example of a substation in which the present invention is applied;

Figure 1:
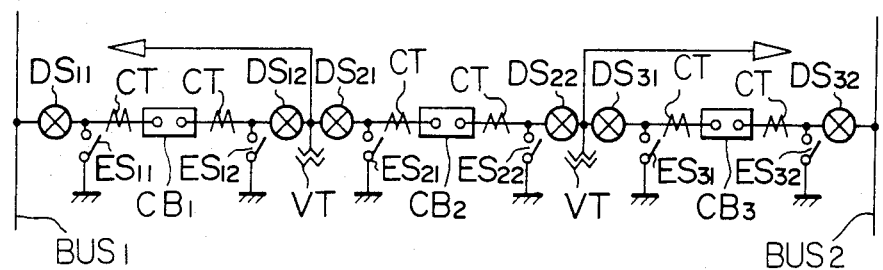
Figure 2:
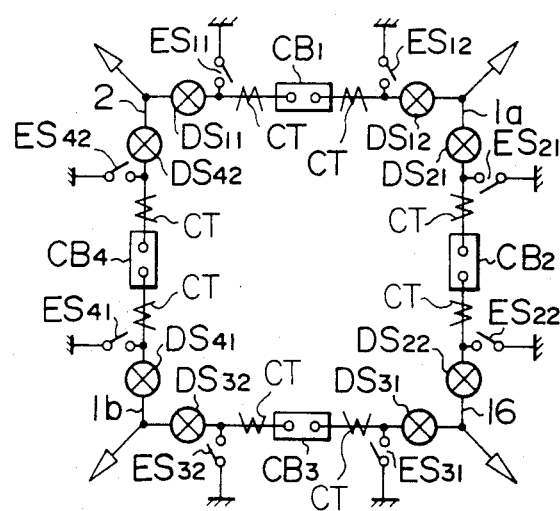

Referring more specifically to the drawings, there are shown in FIGS. 1 and 2 examples of electric circuits of a substation to which the present invention is applied. FIG. 1 is a skeleton diagram showing a so-called one-and-a-half CB system in which two main bus bars $BUS_1$ and $BUS_2$ are connected through three circuit breakers CB1, CB2 and CB3 so that electric power is transferred through points between the circuit breakers. The circuit of FIG. 2 is referred to as the ring bus system wherein four circuit breakers CB1, CB2, CB3 and CB4 are connected in a ring form to transfer electric power through points between the circuit breakers. In FIGS. 1 and 2, each of the circuit breakers have one disconnecting switch DS connected at its each terminal. Further, each of the circuit breakers can be selectively grounded at their terminals through respective earthing switches ES.

Upon occurrence of the fault of short-circuiting to the ground, the steady current and the current due to the fault are compared with each other by means of the current transformers CT connected at both ends of each of the circuit breakers, whereby the fault current is interrupted by the associated circuit breaker.

FIGS. 3 to 6 illustrates a gas insulated switchgear equipment which corresponds to the circuit of FIG. 1 and is realized for a three-phase application. The switchgear equipment basically consists of three switchgear units respectively shown in FIGS. 4 to 6. More specifically, main bus bars 1 and 2 are fixed to a suitable mounting base of disposed slidably in their axial directions and in parallel with each other, as will be seen from a plan view of the switchgear equipment of FIG. 3. On the left side of the bus bars 1 and 2, the three circuit breakers CB1, CB2 and CB3 which are electrically connected in series between the bus bars 1 and 2, are disposed in a line parallelly to the main bus bars. Bus bar means for electrically connecting the circuit breakers in series are provided on the main bus side of the respective circuit breakers, as will be explained later. Explanation will be now made as to the switchgear units of FIGS. 4 to 6 and then as to the reason why the configuration of FIG. 3 corresponds to the circuit diagram of FIG. 1.

Figure 4:
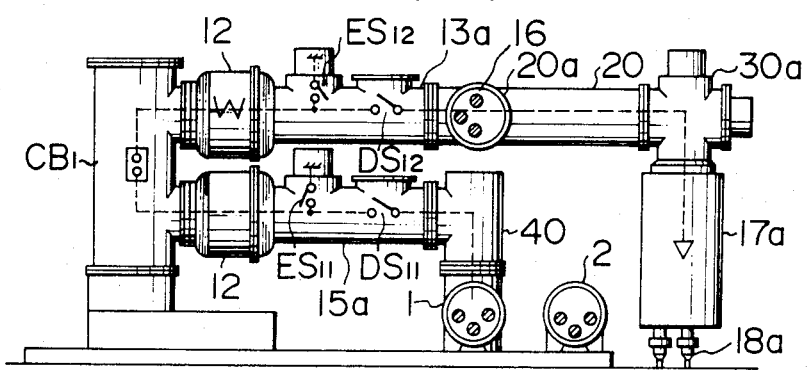
FIGS. 4 to 6 are cross-sectional views taken along lines IV—IV, V—V and VI—VI respectively in FIG. 3.
Figure 5:
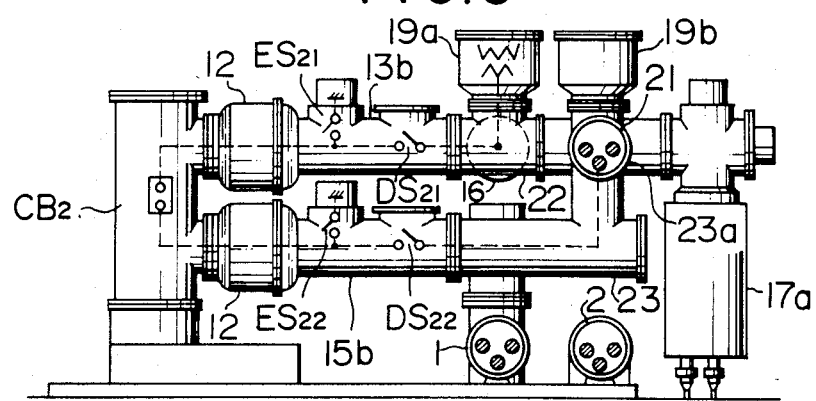
Figure 6:
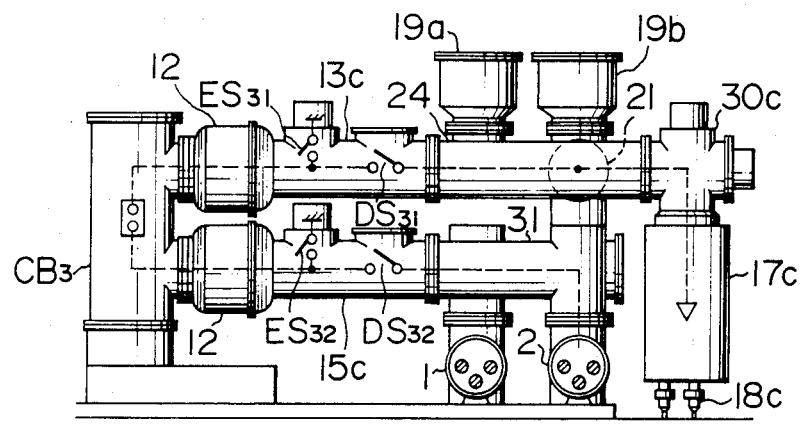

FIG. 4 shows the switchgear unit including the vertically disposed circuit breaker CB1. In this unit an upper electric line 13a is connected to an upper terminal of the circuit breaker CB1 via a current transformer 12. The line 13a includes a disconnecting switch DS12 and an earthing switch ES12. Further, a lower electric line 15a which includes a disconnecting switch DS11 and an earthing switch ES11 is connected via another current transformer 12 to a lower terminal of the circuit breaker CB1. The upper line 13a is the same in configuration as the lower one 15a, and these lines are arranged in a vertical plane which passes the vertical axial line of the circuit breaker CB1. With respect to the wiring configuration between the circuit breaker and disconnecting switch, the same can be applied to other switchgear units of FIGS. 5 and 6. The lower line 15a is connected through a substantially vertically disposed connecting bus bar 40 to the main bus bar 1 fixedly mounted on the base. On the other hand, the upper line 13a is connected to cables 18a via a connecting bus bar 20 provided at its side wall with a branch portion 20a, a separator 30a and a cable head 17a. An upper connecting bus bar 16 located above and substantially along the main bus 1 is connected to the branch portion 20a at its one end and connected at its other end to a first end of a three-way bus bar 22 in the switchgear unit of FIG. 5 which includes the circuit breaker CB2 electrically connected between the circuit breakers CB1 and CB3. A second and a third end of the three-way bus 22 are respectively connected to the upper line 13b and a voltage transformer 19a. A lower electric line 15b in FIG. 5 is connected via an L-shaped connecting bus bar 23 to a voltage transformer 19b. Both of the voltage transformers 19a and 19b are disposed at a substantially identical level. The connecting bus bar 23 has a branch portion 23a which is located substantially at the same level as the upper connecting bus 16 and to which an end of an upper connecting bus bar 21 is connected. The other end of the upper connecting bus 21 is connected to a connecting bus bar 24 which in turn is connected to an upper electric line 13c as shown in FIG. 6. The connecting bus 24 is connected to cables 18c via a separator 30c and a cable head 17c. On the other hand, a lower electric line 15c is connected through a connecting bus bar 31 to the main bus 2.

The embodiment has several features. First, three circuit breakers CB1, CB2 and CB3 are disposed such that the circuit breaker CB2 connected electrically between and disposed positionally between the other circuit breakers CB1 and CB2. Secondly, the electrically intermediate circuit breaker CB2 may alternatively be located at an outer position in the alignment of the three circuit breakers. In this case, the positions of the upper connecting bus bars 16 and 21 should be properly arranged in a different manner from those shown in FIGS. 3 to 6. Thirdly, the upper connecting bus bars 16 and 21 are located substantially at the same level. For this reason, the three circuit breakers CB1 to CB3 are respectively connected to the main bus bar 1, the voltage transformers 19b and the main bus bar 2 through the respective lower lines 15a to 15c and connected to the respective insulatedly-led-out means, such as the cable head 17a, the voltage transformer 19a and the cable head 17c, through the upper lines 13a to 13c. Fourthly, since the upper connecting bus bars 16 and 21 are respectively positioned substantially directly above the main buses 1 and 2, the arrangement of the insulated gas switchgear equipment can be simplified. Fifthly, the positional relation between the main buses 1 and 2 and the circuit breakers CB1 to CB3 is preferable according to the present invention. In the most preferable example, the circuit breakers CB1 to CB3, upper electric lines 13a to 13c and lower electric lines 15a to 15c are respectively arranged in the respective vertical planes which pass the vertical axes of the circuit breakers CB1 to CB3. The circuit breakers CB1 to CB3 are also respectively disposed to be perpendicular to the main buses 1 and 2. The bus means for electrically connecting between the circuit breakers as well as between the circuit breakers and the main bus bars 1 and 2 are divided into two groups; one group including connecting bus bars, such as 20 and 40 in FIG. 4, which are disposed in the above-mentioned vertical plane with respect to the associated circuit breaker, and the other group including upper connecting bus bars such as 16 and 21 in FIG. 3, which are perpendicular to the above-mentioned vertical plane. Therefore, by arranging the insulated-led-out means, such as the cable heads 17a and 17c, as well on the assocated vertical plane, the switchgear units with the less number of connecting casings or enclosures can be obtained.

With the circuit shown in FIG. 1, the voltage transformers 19a and 19b may be connected to the upper connecting bus 16 and 21, as necessary. However, if it is preferable to connect the voltage transformers 19a and 19b to the intermediate switchgear unit as in the present embodiment, then such switchgear unit having no cable head as shown in FIG. 5 may be employed. In this embodiment, the two voltage transformers can be disposed close to each other and be arranged in the vertical plane which passes the vertical axis of the circuit breaker CB2. This is most preferable, especially when the cable heads 17a and 17c in the switchgear equipment is provided outside of the connecting buses 20 and 24, but the similar effect can be also achieved when the cable heads 17a and 17c are connected to the upper connecting conductors 16 and 21.

With the gas insulated switchgear equipment as described in the foregoing, some 70% of the space occupied by the equipment can be shared with the switchgear units. As will be easily appreciated from the following explanation, most space occupied by the gas insulated switchgear equipment corresponding to the circuit of FIG. 2 can be also shared with the switchgear units.

Figure 7:
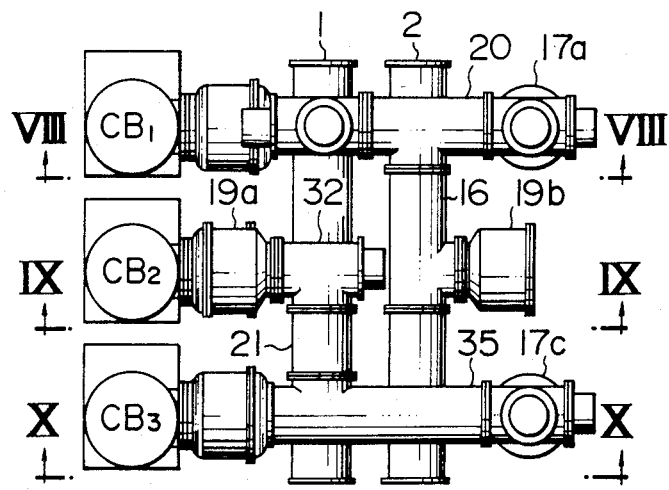
FIG. 7 is a top plan view of a gas insulated switchgear equipment in accordance with another embodiment of the present invention corresponding to the circuit connection of FIG. 1.

FIGS. 7 to 10 show a gas insulated switchgear equipment according to another embodiment of the present invention. The equipment of FIG. 7 is substantially the same as that of FIG. 3, except that a disconnecting switch connected to each end of circuit breakers has a substantially cross-shaped enclosure.

Figure 8:
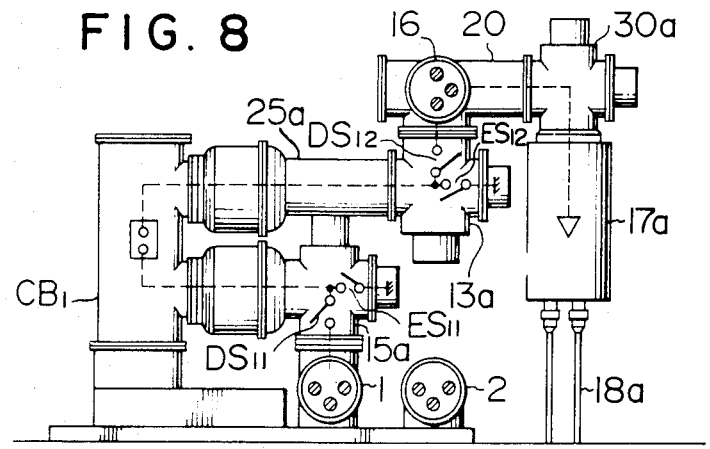
FIGS. 8 to 10 are cross-sectional views taken along lines VIII—VIII, IX—IX and X—X respectively in FIG. 7.

Turning now to FIG. 8, there is shown a switchgear unit including a circuit breaker CB1, in which main buses 1 and 2 are provided closer to the circuit breaker CB1 when compared with the configuration of FIG. 4, because a lower electric line 15a including a disconnecting switch DS11 has an enclosure of such a cross shape as shown in FIG. 8 (which is one of the features of the present embodiment).

An upper electric line 13a connected through a connecting bus bar 25a to the circuit breaker CB1, contains therein a disconnecting switch DS12 and the earthing switch ES12. The upper connecting bus bar 16 is located directly above the main bus 2. A connecting bus 20 connected at one end of the bus 16, is connected to cables 18a via a separator 30a and a cable head 17a.

Figure 9:
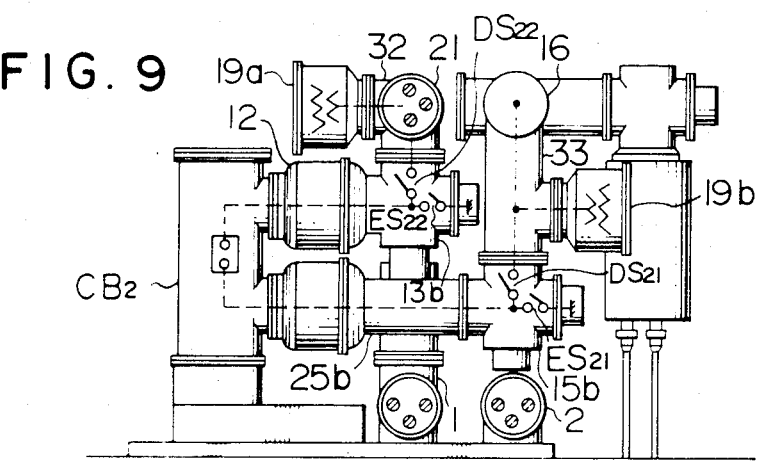

The other end of the upper connecting bus 16, as illustrated in FIG. 9, is connected to a connecting bus bar 33 which in turn is connected to a circuit breaker CB2 through a lower line 15b via a connecting bus bar 25b. A voltage transformer 19b is connected to the connecting bus 33. A connecting bus bar 21 is provided at the same level as the upper connecting bus 16 and connected at its one end to an upper line 13b by way of a three-way bus bar 32. The upper line 13b located substantially directly above the main bus 1 is connected via a current transformer 12 to the upper terminal of the circuit breaker CB2, unlike the arrangement of FIG. 8. Substantially directly above the current transformer 12, there is vertically disposed a voltage transformer 19a which is connected to one opening of the three-way bus bar 32.

Figure 10:
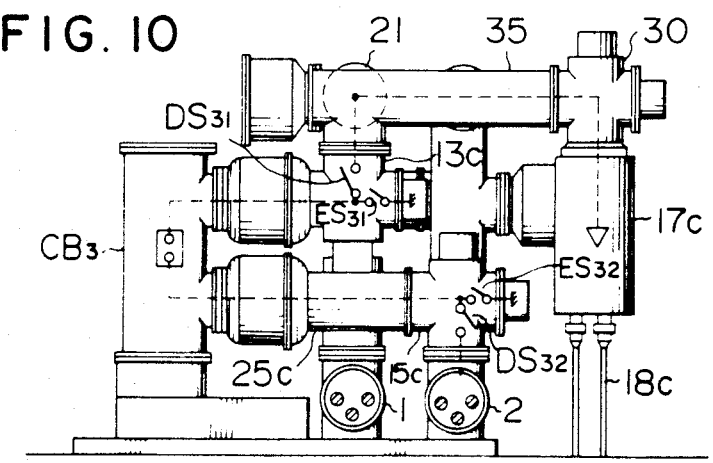

The switchgear unit of FIG. 9 is different from that of FIG. 8 in the position of the upper and lower lines 13a, 13b and 15a. More specifically, the upper line 13a is located above the main bus 2 while the lower line 15a is located just above the main bus 1, in the switchgear unit of FIG. 8. In the switchgear unit of FIG. 9, on the other hand, the upper line 13b is located above the main bus 1 whereas the lower line 15b is located above the main bus 2. However, otherwise, the switchgear units of FIGS. 8 and 9 each have identical component elements around the respective circuit breakers, and the connecting bus 25a in FIG. 8 is the same as the connecting bus 25b in FIG. 9. The other end of the upper connecting bus 21 is connected to a first end of a three-way connecting bus 35 as shown in FIG. 10. Second and third ends of the three-way bus 35 are connected respectively to an upper line 13c and a separator 30c which further leads to a cable head 17c. A lower line 15c is connected to the main bus 2.

In the second embodiment of FIG. 7, the circuit configuration thereof corresponds to FIG. 1. Only a difference between the embodiments of FIGS. 3 and 8 respectively is that the upper connecting buses 16 and 21 are positioned at a substantially identical level to the upper line 13a in the FIG. 3 embodiment, while the buses 16 and 21 are positioned at different levels in the FIG. 7 embodiment. This difference allows the distance between the cables and the circuit breakers to be relatively reduced.

Figure 3:
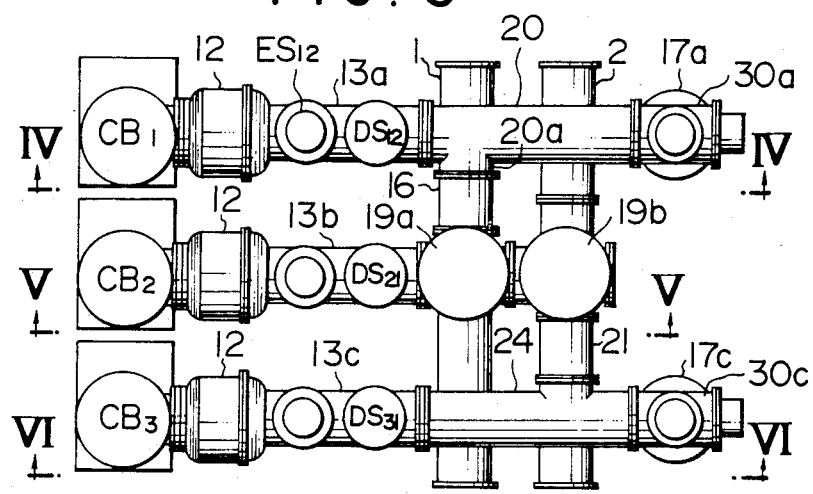
FIG. 3 is a top plan view of a gas insulated switchgear equipment in accordance with an embodiment of the present invention corresponding to the circuit connection of FIG. 1.

Further, attention should be directed to the fact that the upper connecting buses 16 and 21 are provided substantially at the same level in each of the embodiments of FIGS. 3 and 7. This enables the upper connecting buses 16 and 21 to be each formed into a simple linear structure, whereby the switchgear units can be disposed close to each other.

Next, explanation will be directed to FIGS. 11 to 14 showing a further embodiment of the switchgear equipment in accordance with the present invention. In this embodiment, two types of disconnecting switches already explained earlier are used for the purpose of reducing the vertical and horizontal dimensions or the whole size of the switchgear equipment.

Figure 11:
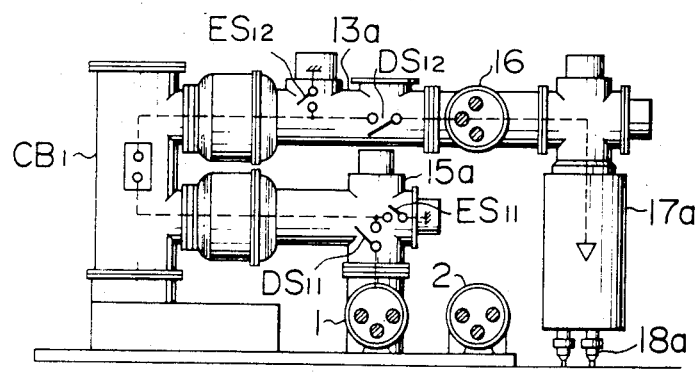
FIGS. 11 to 13 are partial cross-sectional views of switchgear units which form a switchgear equipment of a further embodiment of the present invention corresponding to the circuit connection of FIG. 1.
Figure 12:
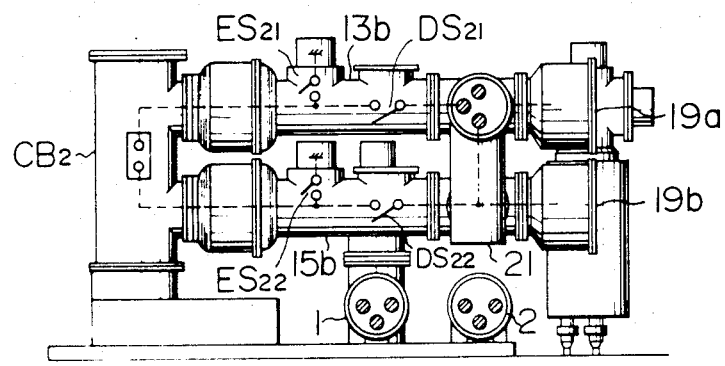
Figure 13:
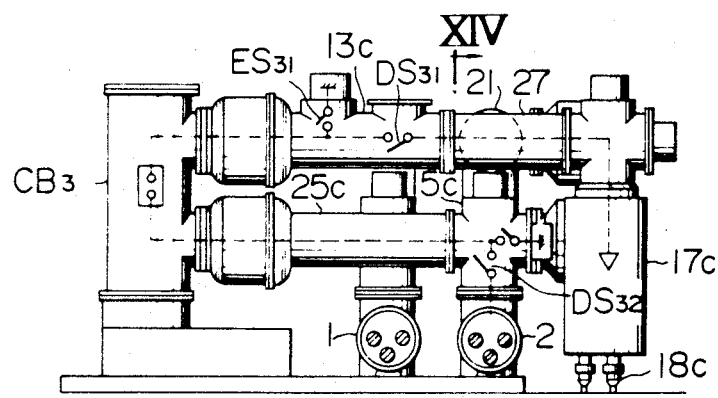
Figure 14:
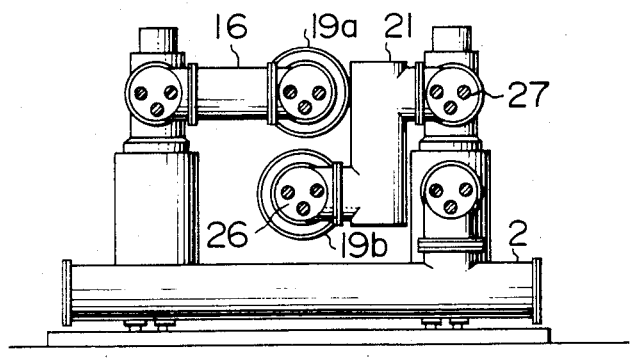
FIG. 14 is a cross-sectional view taken along line XIV—XIV in FIG. 13.

In FIG. 11, a disconnecting switch DS12 included in an upper line 13a is the same as that in FIG. 4, a disconnecting switch DS11 included in a lower line 15a is the same as that in FIG. 8, and main buses 1 and 2 are provided close to a circuit breaker CB1. An upper connecting bus 16 is located at the same level as the upper line 13a and is of linear configuration as shown in FIG. 14. In FIG. 12, an upper and a lower line 13b and 15b having an identical structure and extending horizontally are connected to a circuit breaker CB2 at their one ends and connected respectively to voltage transformers 19a and 19b at their other ends. As best seen from FIG. 14, an upright upper connecting bus 21 is featured in that it is connected at its lower one end to a connecting bus 26 which leads to the lower line 15b, while connected at the other upper end to a connecting bus 27 which leads to the upper line 13c. It will be readily seen from the above explanation that the upper connecting buses 16 and 21 are in an identical plane.

A switchgear unit of FIG. 12 has the same upper and lower lines 13b and 15b as in FIG. 5. On the other hand, a switchgear unit of FIG. 13 has the same upper line 13c as in FIG. 6 and the same lower line 15c as in FIG. 10.

The foregoing explanation in the three different embodiments has been made in the case where power is guided by means of cables, but instead of such cables bushings may be employed as necessary.

In the above-mentioned system wherein three circuit breakers are connected between the main buses, the main buses are mounted on an attaching base and the three circuit breakers are aligned on one side with respect to the main buses, so that the present invention can provide a gas insulated switchgear equipment which is simple in arrangement, resistive to earthquake shock, and easy to maintain and inspect the equipment.

In addition, with respect to electrical interconnection between the three circuit breakers, the respective two outer circuit breakers CB1 and CB3 are connected to the intermediate circuit breaker CB2 through the upper lines, so that the insulated switchgear equipment according to the present invention can be simplified in arrangement. Furthermore, even if the three circuit breakers are not lined up in a line, the equipment may show the same effects.

Figure 15:
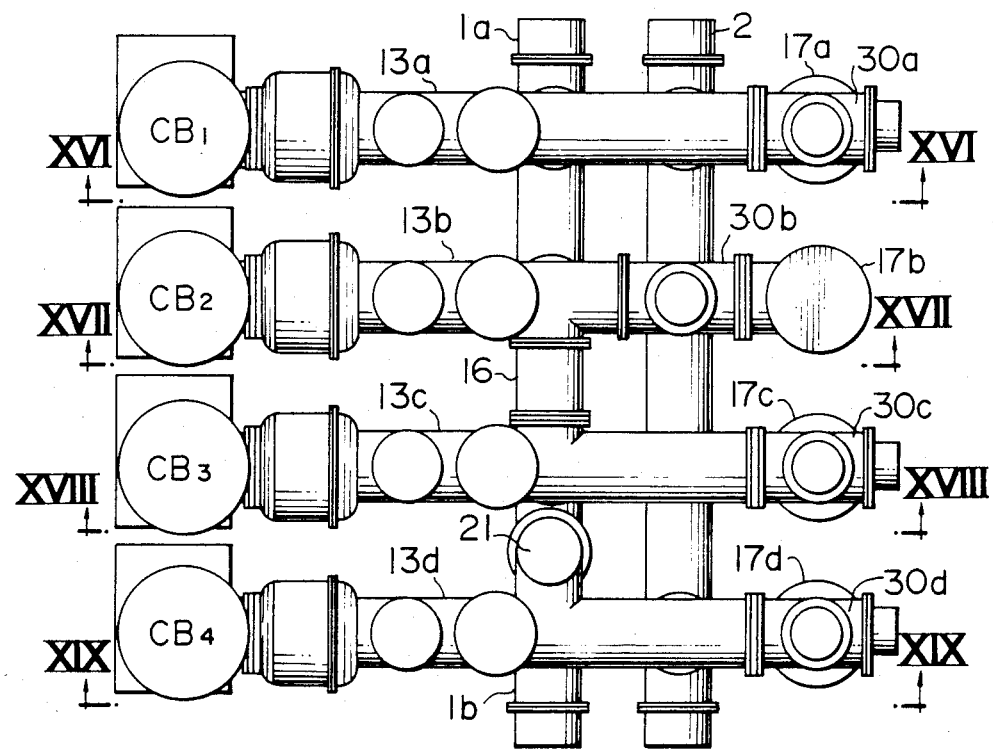
FIG. 15 is a top plan view of the gas insulated switchgear equipment according to yet another embodiment of the present invention corresponding to the circuit connection of FIG. 2.

FIGS. 15 to 19 show a gas insulated switchgear equipment whose circuit diagram corresponds to FIG. 2. The switchgear equipment will be detailed with reference to FIGS. 15 to 19. Turning first to FIG. 15, there is shown a plan view of the switchgear equipment which includes lower bus bars 1a and 1b provided closer to circuit breakers CB1 to CB4 and a lower bus bar 2 which is provided on the opposite side to the breakers with respect to the lower buses 1a and 1b and which is parallel with the buses 1a and 1b. The lower bus 1a connects the circuit breakers CB1 and CB2, the lower bus 1b connects the circuit breakers CB3 and CB4, and the lower bus 2 connects the circuit breakers CB1 and CB4. Cable heads 17a to 17c are provided, as insulated-led-out means, supplying or receiving power to or from the respective circuit breakers. The cable heads 17a to 17c are disposed at the illustrated positions, but they may be provided at any suitable positions so long as they may constitute the circuit of FIG. 2.

FIGS. 16 to 19 illustrate switchgear units which form the switchgear equipment of FIG. 15. Each of the switchgear units of FIGS. 16 to 19 includes a circuit breaker CB1, CB2, CB3 or CB4 and two current transformers 12 vertically disposed at the upper and lower terminals of the circuit breaker. In the respective units, upper and lower lines 13a and 15a; 13b and 15b; 13c and 15c; and 13d and 15d are arranged in vertical planes respectively containing the circuit breakers CB1 to CB4.

Figure 16:
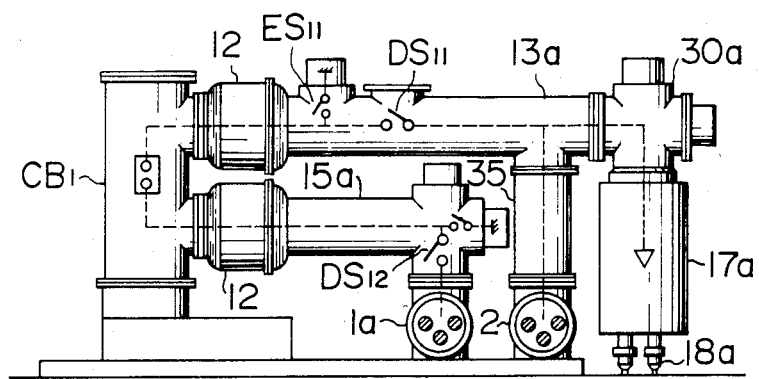
FIGS. 16 to 19 are cross-sectional views taken along lines XVI—XVI, XVII—XVII, XVIII—XVIII and XIX—XIX respectively in FIG. 15.
Figure 17:
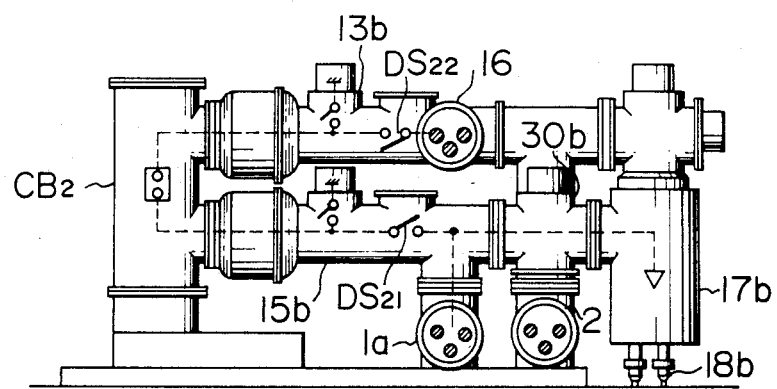
Figure 18:
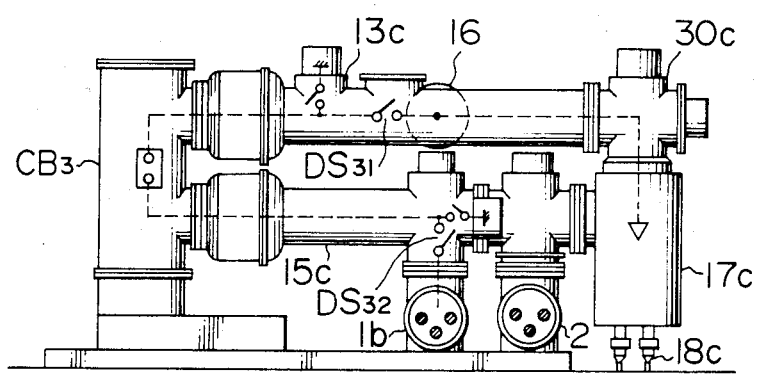
Figure 19:
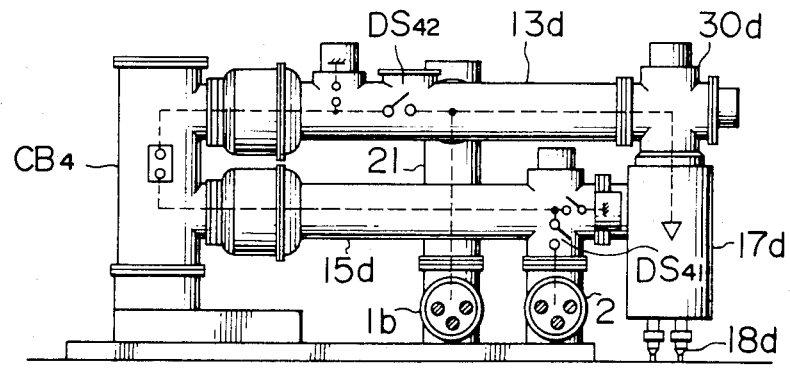

The upper line 13a shown in FIG. 16 is of linear configuration and is connected to cables 18a by way of a 90°-bent separator 30a and the cable head 17a. A connecting bus bar 35 is connected at its one end to the upper line 13a at its lower right side, and connected at its other end to the lower bus 2. On the other hand, the lower line 15a is connected to the lower bus 1a. The lower bus 1a terminates at the position shown in FIG. 17 at which it is connected to the lower line 15b. The right end of the lower line 15b which constitutes a connection between the circuit breakers CB1 and CB2 is connected to cables 18b via a separator 30b and a cable head 17b. The upper line 13b of the circuit breaker CB2 is connected to one end of an upper bus 16 which is located directly above the lower bus 1a, and the other end of the upper bus 16 is branchedly connected to the upper line 13c shown in FIG. 18. This branching connection portion of the upper line 13c constitutes a connection between the circuit breakers CB2 and CB3 and is connected to cables 18c via a separator 30c and a cable head 17c. The lower line 15c of the circuit breaker CB3, in FIG. 18, is connected to one end of the lower bus 1b which is disposed axially in alignment with the bus 1a. The other end of the lower bus 1b is connected to the lower end of a vertically extending bus 21 which is disposed between the switchgear units of FIGS. 18 and 19. The upper end of the vertical bus 21 is branchedly connected to the upper line 13d in FIG. 19. This branched connection portion forms a connection between the circuit breakers CB3 and CB4 and is connected to cables 18d via a separator 30d and a cable head 17d. The lower line 15d of the circuit breaker CB4, in FIG. 19, is connected to one end of the lower bus 2 the other end of which is connected to the connecting bus 35 in the FIG. 16. Thus, the cable 18a is connected between the circuit breakers CB4 and CB1.

Since the circuit breakers are also lined up on one side of the switchgear equipment in this embodiment, the respective circuit breakers can be easily maintained and inspected. It will be readily understood from comparison between FIGS. 3 to 14 and FIGS. 15 to 19 that the gas insulated switchgear equipment of FIG. 15 can have substantially the same configuration units as those of FIGS. 3 and 7 which correspond to the circuit configuration of FIG. 1. Further, as seen from the switchgear equipment of this embodiment is arranged as if it is constituted by a pair of main bus bars and the four switchgear units of substantially the same structure which are provided in the respective four vertical planes perpendicular to the main bus bars, resulting in a simple arrangement of the equipment. Alternatively, if a substantially Z-shaped connecting bus is provided at the right end of the lower line 15b in FIG. 17, then the separator 30b and cable head 17b can have the same structure as those in the other switchgear units. In this case, the respective switchgear units will be much similar to each other with respect to their arrangement.

Figure 20:
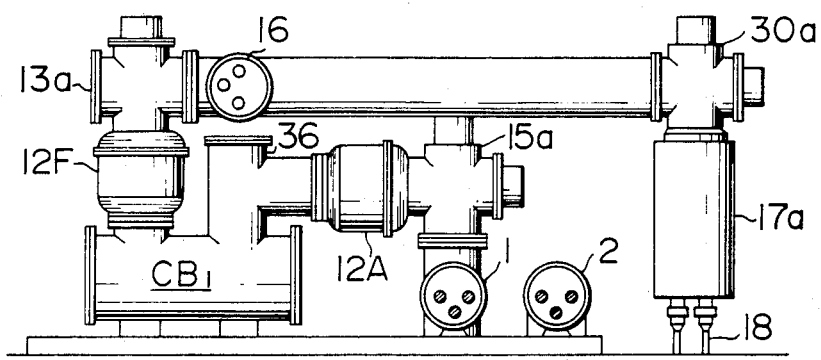
FIGS. 20 to 22 are partial cross-sectional views of switchgear units which form a switchgear equipment of still a further embodiment of the present invention corresponding to the connection of FIG. 1.
Figure 21:
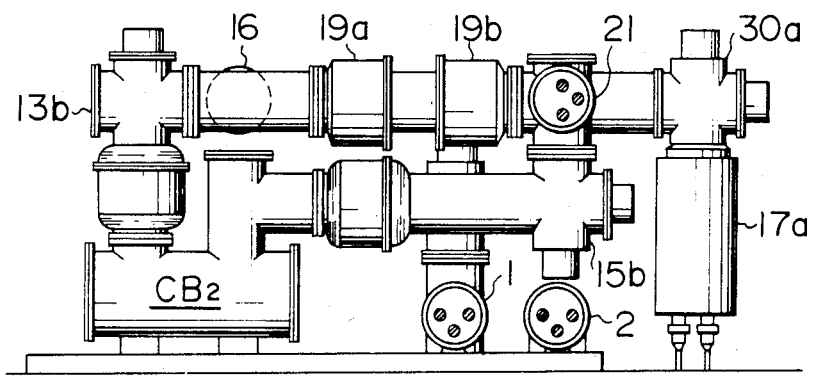
Figure 22:
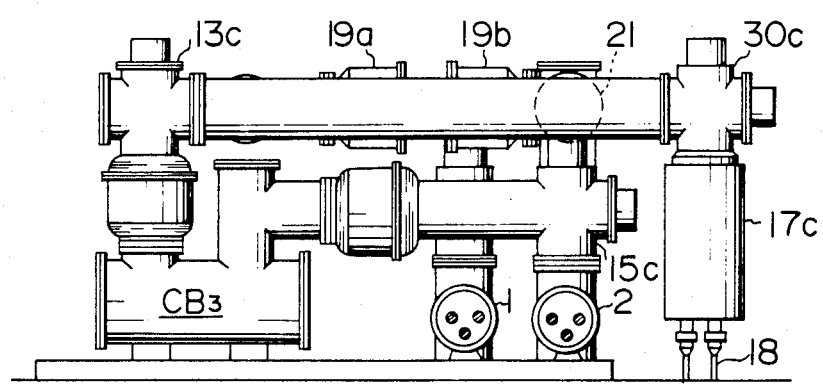

Although the foregoing explanation has been made in connection with the various embodiments in which circuit breakers of the vertical type are used, it will be easily understood that each of the circuit breakers may be arranged horizontally. FIGS. 20 to 22 show yet a further embodiment wherein each of the circuit breakers is disposed horizontally. This embodiment of FIGS. 20 to 22 corresponds to that shown in FIGS. 4 to 6 and like reference numerals used in FIGS. 20 to 22 designate like or equivalent elements of FIGS. 4 to 6. In the respective switchgear units, circuit breakers CB1 to CB3 are disposed horizontally, and connected to first lines 13a to 13c through respective current transformers 12F which are disposed below the respective first lines. Each of the other respective current transformers 12A is connected to the horizontal portion of a branched conductor 36 which is led out horizontally at the same level as the current transformer 12F from each of the circuit breakers CB1 to CB3. Such an arrangement, in particular, allows voltage transformers 19a and 19b to be disposed face to face along a horizontal axis as shown in FIG. 21, so that the height of the switchgear equipment can be reduced.

FIGS. 23 to 27 show a gas insulated switchgear equipment according to a still further embodiment of the present invention which is an improvement of the embodiment of FIG. 15 and in which like reference numerals are used to designate like or equivalent elements of FIG. 15. In the drawings, an upper bus bar 1a connects the circuit breakers CB1 and CB2, a connecting bus 16 connects the circuit breakers CB2 and CB3, an upper bus 1b connects the circuit breakers CB3 and CB4 and a lower bus 2 connects the circuit breakers CB4 and CB1.

Figure 24:
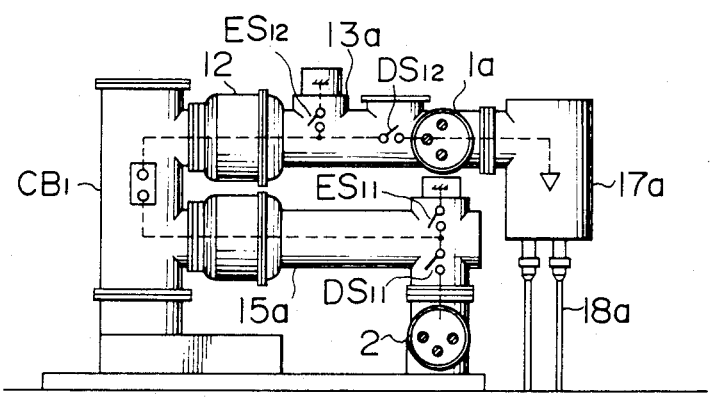
FIGS. 24 to 27 are cross-sectional views taken along lines XXIV—XXIV, XXV—XXV, XXVI—XXVI and XXVII—XXVII respectively in FIG. 23.
Figure 25:
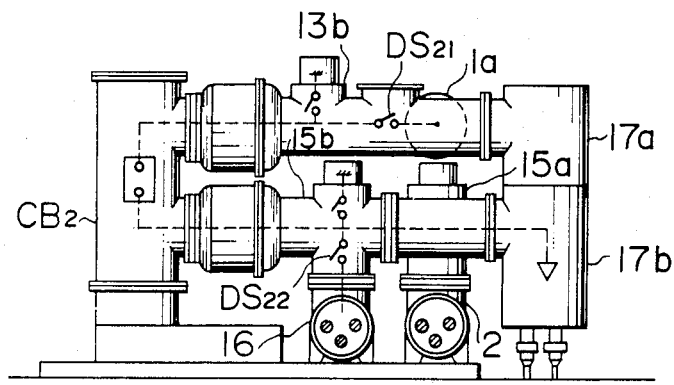
Figure 26:
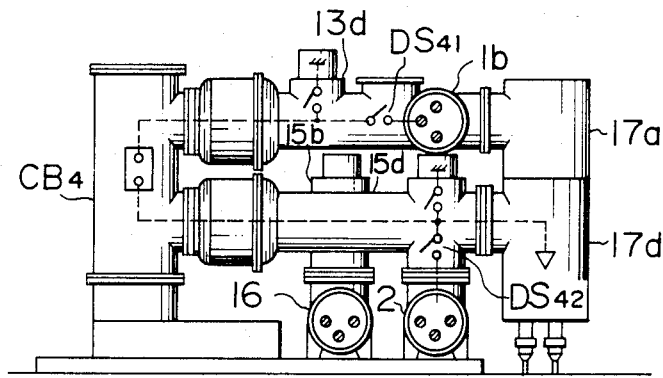
Figure 27:
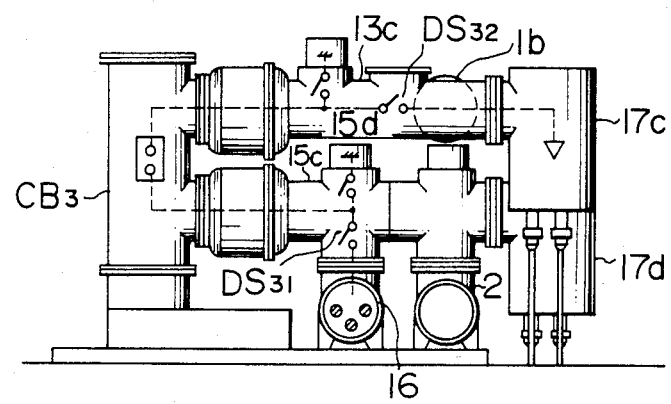

The switchgear unit including the circuit breaker CB1 is shown in FIG. 24 in which a lower line 15a is connected to the lower bus 2 which is mounted on the fixing base, while an upper line 13a is connected to one end of the upper bus 1a. The upper bus 1a is located substantially directly above the lower bus 2 in this embodiment, but it may alternatively be located in an offset relation therewith, as necessary. The other end of the upper bus 1a extending in the same direction as the lower bus 2 is connected to an upper line 13b of the circuit breaker CB2 as shown in FIG. 25. In FIG. 25, a lower line 15b is connected to one end of a connecting bus 16 which is located parallel with the lower bus 2. The connecting bus 16 is supported on the fixing base and extends in the same direction as the direction in which the circuit breakers line up. The other end of the connecting bus 16 is connected to a lower line 15c of the circuit breaker CB3 as shown in FIG. 27. Therefore, the connecting bus 16 passes by the adjacent switchgear unit of the circuit breaker CB4 as shown in FIG. 26.

On the other hand, an upper line 13c of the circuit breaker CB3 in FIG. 27 is connected to the connecting bus 1b. The bus 1b is axially aligned with the connecting bus 1a. The other end of the connecting bus 1b is connected to an upper line 13d of the circuit breaker CB4 in FIG. 26. A lower line 15d of the circuit breaker CB4 in FIG. 26 is connected to the lower bus 2 as already described earlier.

Figure 23:
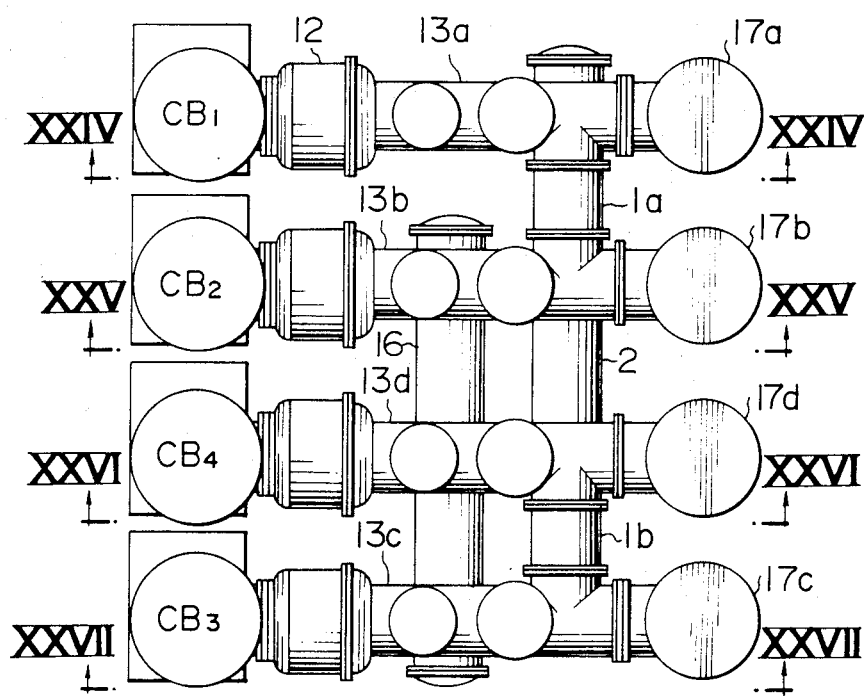
FIG. 23 is a top plan view of still another embodiment of the gas insulated switchgear equipment in accordance with the present invention corresponding to the circuit connection of FIG. 2.

In this manner, there is an arrangement corresponding to the circuit of FIG. 2. In this embodiment, such a vertical bus 21 as shown in FIG. 15 can be made unnecessary by changing the mounting position of the circuit breaker CB3. For this reason, the connecting buses used for connecting the circuit breakers are all disposed in the line-up direction of the circuit breakers. In this embodiment, there is no vertical connecting bus as shown in FIG. 19. This is because two of the four circuit breakers connected in a ring form which are not directly connected to each other, for example CB1 and CB3 in FIG. 23, are located at the outer sides of the lined-up arrangement of the circuit breakers. Alternatively, instead of the two circuit breakers CB1 and CB3, the circuit breakers CB2 and CB4 may be disposed at the outer sides of the arrangement of the circuit breakers. Further, no separator has been used in this embodiment, but if desired, separators may of course be inserted in the embodiment. In this case, if such connecting buses as to allow adjustment of the level of their connecting portion are employed, then such separators and cable heads as 30a and 17a in FIG. 16 can be applied to all the switchgear units. With the arrangmenet of FIGS. 23 to 27, in particular the arrangement utilizing vertical planes respectively including the axes of the circuit breakers and the positions of the buses 1a, 1b, 2 and 16, as has been explained in the foregoing, the similar effect can be achieved as in the embodiment of FIGS. 3 to 6.

While the present invention has been explained with reference to the preferred embodiments shown in the drawings, it should be understood that the invention is not limited to those embodiments but covers all other possible modifications, alternatives and equivalent arrangements included in the scope of the appended claims. For example, the present invention can be applied to a ring bus system in which five circuit breakers are electrically interconnected in a ring form, as well as to a system based on the circuits of FIGS. 1 and 2 and further provided with additional circuits. In the ring bus system including the five circuit breakers, for example, such a switchgear unit as shown in FIG. 4 can be connected between such a switchgear unit having the circuit breaker CB3 and such a switchgear unit having the circuit breaker CB4 as shown in FIG. 15. With this arrangement, such a vertical bus 21 located between the circuit breakers CB3 and CB4 as shown in FIG. 19 can be omitted.

What is claimed is:

1. A gas insulated switchgear equipment comprising two main bus bars substantially parallelly supported on a mounting surface, a plurality of circuit breakers disposed on said mounting surface at one side of said main bus bars, first and second electric lines connected to each of said circuit breakers, bus means disposed on the main bus side of said circuit breakers for electrically connecting said circuit breakers in series, said bus means extending substantially parallel with said main bus bars, and said plurality of circuit breakers being disposed on a diposition line which is substantially parallel with said main buses.

2. A gas insulated switchgear equipment as set forth in claim 1, wherein the number of said circuit breakers is at least four, and said bus means electrically interconnect said circuit breakers in a ring-like array.

3. A gas insulated switchgear equipment as set forth in claim 2, further including a first and a second electric line connected to each of said circuit breakers, said first and second electric lines of each of said circuit breakers being disposed in a vertical plane passing substantially through an axial line of the associated one of said circuit breakers.

4. A gas insulated switchgear equipment as set forth in claim 3, wherein said circuit breakers are four in number, said bus means including lower bus bars for connecting respective ones of said first and second electric lines of the two circuit breakers disposed positionally on outer sides among said four circuit breakers, said lower bus bars being supported on said mounting surface along an axial line substantially perpendicular to said respective vertical planes of said four circuit breakers.

5. A gas insulated switchgear equipment as set forth in claim 4, further including a first and a second electric line connected to each of said circuit breakers and wherein said bus means includes two lower bus bars connecting respective one of said first and second electric lines of each of said two outer disposed circuit breakers to respective one of said first and second electric lines of each of the two inner disposed circuit breakers which is not next to said outer disposed circuit breaker, and two connecting bus bars connecting the other of said first and second electric lines of each of said two outer disposed circuit breakers to the other of said first and second electric lines of each of said two inner disposed circuit breakers which is not next to said outer disposed circuit breaker, said two lower bus bars being supported on said mounting surface, said two connecting bus bars being located above said lower bus bars.

6. A gas insulated switchgear equipment as set forth in claim 2, wherein two of said four circuit breakers which are not electrically connected directly to each other are disposed positionally on outer sides of the other two circuit breakers.

7. A gas insulated switchgear equipment as set forth in claim 5, wherein said connecting bus bars are disposed substantially directly above one of said lower bus bars.

8. A gas insulated switchgear equipment as set forth in claim 3, further including insulated-led-out means connected between four electric lines electrically connected in series, said insulated-led-out means being arranged in said respective vertical planes of said circuit breakers.

9. A gas insulated switchgear equipment comprising three circuit breakers substantially parallely supported on a mounting surface, two main bus bars substantially parallelly supported on one side of said circuit breakers, an axial line of each of said main bus bars being substantially perpendicular to three vertical planes passing through respective axial lines of said circuit breakers, a first and a second electric line connected to each of said circuit breakers, a first connecting bus means electrically connecting said first and second electric lines of each of said circuit breakers in series, said first connecting bus means extending substantially parallel with said main bus bars, and a second connecting bus means connecting one of said first and second electric lines of each of the two circuit breakers which are disposed outermost said three circuit breakers to a different one of said main buses.

10. A gas insulated switchgear equipment as set forth in claim 9, further including insulated-led-out means electrically connected to said electric lines of each of said two circuit breakers respectively arranged in the outer two of said three vertical planes, at one ends of said electric lines opposite to said two circuit breakers.

11. A gas insulated switchgear equipment as set forth in claim 10, further including voltage transformers connected respectively to said first and second electric lines of said circuit breaker electrically connected between the outer two circuit breakers.

12. A gas insulated switchgear equipment as set forth in claim 11, wherein said first and second electric lines and said insulated-led-out means are provided in said two outer vertical planes, and said voltage transformers are provided in the intermediate one of said three vertical planes.

13. A gas insulated switchgear equipment as set forth in claim 9, wherein a portion of said first connecting bus means which has an axial line connecting said vertical planes is located substantially directly above one of said main bus bars.

14. A gas insulated switchgear equipment as set forth in claim 9, wherein said circuit breakers are connected to said first and second electric lines in said respective three vertical planes, and said second connecting bus means are disposed in the vertical planes of the two circuit breakers electrically connected at both ends of said three circuit breakers connected in series.

15. A gas insulated switchgear equipment as set forth in claim 14, wherein a connection portion at which said first connecting bus means is connected to said both electric lines of said electrically intermediate circuit breaker and another connecton portion at which said first connecting bus means is connected to one of said electric lines of each of the circuit breakers electrically connected at both ends of said three circuit breakers are formed at the same level.

16. A gas insulated switchgear equipment as set forth in claim 9, wherein said three circuit breakers are of vertical type, said electrically intermediate circuit breaker is disposed positionally between the other circuit breakers, an upper electric line which is said first electric line of said electrically intermediate circuit breaker is connected to an upper electric line which is said first electric line of one of said electrically outer circuit breakers and a lower electric line which is said second electric line of said electrically intermediate circuit breaker is connected to an upper electric line which is said first electric line of the other of said electrically outer circuit breakers.

* * * * *